United States Patent
Boss et al.

(10) Patent No.: US 11,095,653 B2
(45) Date of Patent: Aug. 17, 2021

(54) SECURE PROVISIONING OF UNKNOWN DEVICES THROUGH TRUSTED THIRD-PARTY DEVICES

(71) Applicant: International Business Machines Corporation, Armonk, NY (US)

(72) Inventors: Gregory J. Boss, Saginaw, MI (US); Andrew R. Jones, Round Rock, TX (US); Charles S. Lingafelt, Durham, NC (US); John E. Moore, Jr., Pflugerville, TX (US); Kevin C. McConnell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/988,766

(22) Filed: May 24, 2018

(65) Prior Publication Data

US 2019/0364049 A1    Nov. 28, 2019

(51) Int. Cl.
*H04L 29/06*    (2006.01)
*G06F 21/45*    (2013.01)

(52) U.S. Cl.
CPC ............ *H04L 63/102* (2013.01); *G06F 21/45* (2013.01); *H04L 63/20* (2013.01); *G06F 2221/2115* (2013.01); *G06F 2221/2117* (2013.01)

(58) Field of Classification Search
CPC ..... H04L 63/20; H04L 63/102; H04L 63/205; H04L 63/0823; H04L 63/08;
(Continued)

(56) References Cited

U.S. PATENT DOCUMENTS

| 8,260,885 B2 | 9/2012 | Lindstrom |
| 8,370,902 B2 | 2/2013 | Davis et al. |

(Continued)

FOREIGN PATENT DOCUMENTS

WO    2013120225 A1    8/2013

OTHER PUBLICATIONS

Murugiah Souppaya, et al., Guidelines for Managing the Security of Mobile Devices in the Enterprise, NIST Special Publication 800-124, Revision 1, Jun. 2013, pp. i-21, U.S. Department of Commerce, Published at: http://dx.doi.org/10.6028/NIST.sp.800-124r1.

(Continued)

*Primary Examiner* — Jung W Kim
*Assistant Examiner* — Sangseok Park
(74) *Attorney, Agent, or Firm* — William H. Hartwell

(57) ABSTRACT

A trusted device responsible for evaluating trustworthiness of unknown devices is provided. Trust evaluation rules usable to determine whether to authorize unknown devices to access a resource are received. A request to access the resource and device evaluation attributes are received from an unknown device. The trustworthiness of the unknown device is evaluated based upon the device evaluation attributes using the trust evaluation rules. In response to determining that the unknown device is trustworthy, a credential for accessing the resource is provided to the unknown device, and the device evaluation attributes of the unknown device and an identification of the unknown device are sent to a registrar for the resource.

18 Claims, 7 Drawing Sheets

(58) Field of Classification Search
CPC ..... H04L 63/1408; G06F 21/45; G06F 21/55; G06F 21/577; G06F 2221/2117; G06F 2221/2115; H04W 12/0609; H04W 4/08
See application file for complete search history.

(56) References Cited

U.S. PATENT DOCUMENTS

| | | | | |
|---|---|---|---|---|
| 8,726,344 | B1* | 5/2014 | Amidon | H04L 63/107 726/2 |
| 9,386,045 | B2 | 7/2016 | Kgil et al. | |
| 9,602,425 | B2 | 3/2017 | Durbha et al. | |
| 2011/0321175 | A1* | 12/2011 | Slater | G06F 21/552 726/28 |
| 2013/0191897 | A1* | 7/2013 | Lindteigen | G06F 21/45 726/6 |
| 2014/0173686 | A1* | 6/2014 | Kgil | H04L 63/205 726/1 |
| 2014/0245394 | A1* | 8/2014 | Abuelsaad | H04L 63/104 726/4 |
| 2015/0006897 | A1* | 1/2015 | Rajakarunanayake | H04L 63/0823 713/176 |

OTHER PUBLICATIONS

Amit Vasudevan, et al., Trustworthy Execution on Mobile Devices: What security properties can my mobile platform give me?, CyLab, Nov. 16, 2011, pp. i-16, Carnegie Mellon University, Pittsburgh, PA, USA.

Author Unknown, Multiple Source Evidence Application Trust Model, Technical Disclosure IPCOM000204598D, Mar. 5, 2011, pp. 1-8, IP.com, Published at: http://ip.com/IPCOM/000204598D.

Author Unknown, Managed Variation of Trust in Deploying Code Changes into a Production Environment, Technical Disclosure IPCOM000250757D, Aug. 30, 2017, pp. 1-5, IP.com, Published at: http://ip.com/IPCOM/000250757D.

IBM, Integrity Based Computing, Technical Disclosure IPCOM000122404D, Apr. 4, 2005, pp. 1-6, IP.com, Published at: http://ip.com/IPCOM/000122404D.

M. Behringer, et al., Autonomic Networking Use Case for Network Bootstrap, Cisco Network Working Group, May 9, 2014, pp. 1-10, Published at: https://tools.ieff.org/html/draft-behringer-autonomic-bootstrap-00.

M. Behringer, et al., Bootstrapping Trust on a Homenet, Cisco Network Working Group, Feb. 13, 2014, pp. 1-9, Published at: https://tools.ieff.org/html/draft-behringer-homenet-trust-bootstrap-02.

Author Unknown, Generic Bootstrapping Architecture, Wikipedia. org, Oct. 12, 2017, pp. 1-4, Published at: https://en.wikipedia.org/wiki/Generic_Bootstrapping_Architecture.

Author Unknown, Get started with Azure, Webpage: Microsoft Azure, Printed from website on May 24, 2018, p. 1, Microsoft Corporation, Published at: https://azure.microsoft.com/en-us/documentation/articles/iot-hub-devicemanagement/.

\* cited by examiner

SECURE PROVISIONING OF UNKNOWN DEVICES THROUGH TRUSTED THIRD-PARTY DEVICES

BACKGROUND

The present invention relates to provisioning of unknown devices within a secure network. More particularly, the present invention relates to secure provisioning of unknown devices through trusted third-party devices.

Devices that attempt to access a secure network utilize one or more credentials provided by a credentialing system associated with the secure network to access and/or login to the secure network. Credentials for new devices are configured within the credentialing system in advance of any attempt by the new devices to access the secure network.

SUMMARY

A computer-implemented method includes, by a processor of a trusted device responsible for evaluating trustworthiness of unknown devices: receiving trust evaluation rules usable to determine whether to authorize unknown devices to access a resource; receiving a request to access the resource and device evaluation attributes from an unknown device; evaluating the trustworthiness of the unknown device based upon the device evaluation attributes using the trust evaluation rules; and in response to determining that the unknown device is trustworthy: (i) providing a credential for accessing the resource to the unknown device, and (ii) sending the device evaluation attributes of the unknown device and an identification of the unknown device to a registrar for the resource.

A system that performs the computer-implemented method and a computer program product that causes a computer to perform the computer-implemented method are also described.

DETAILED DESCRIPTION

Figure 1:
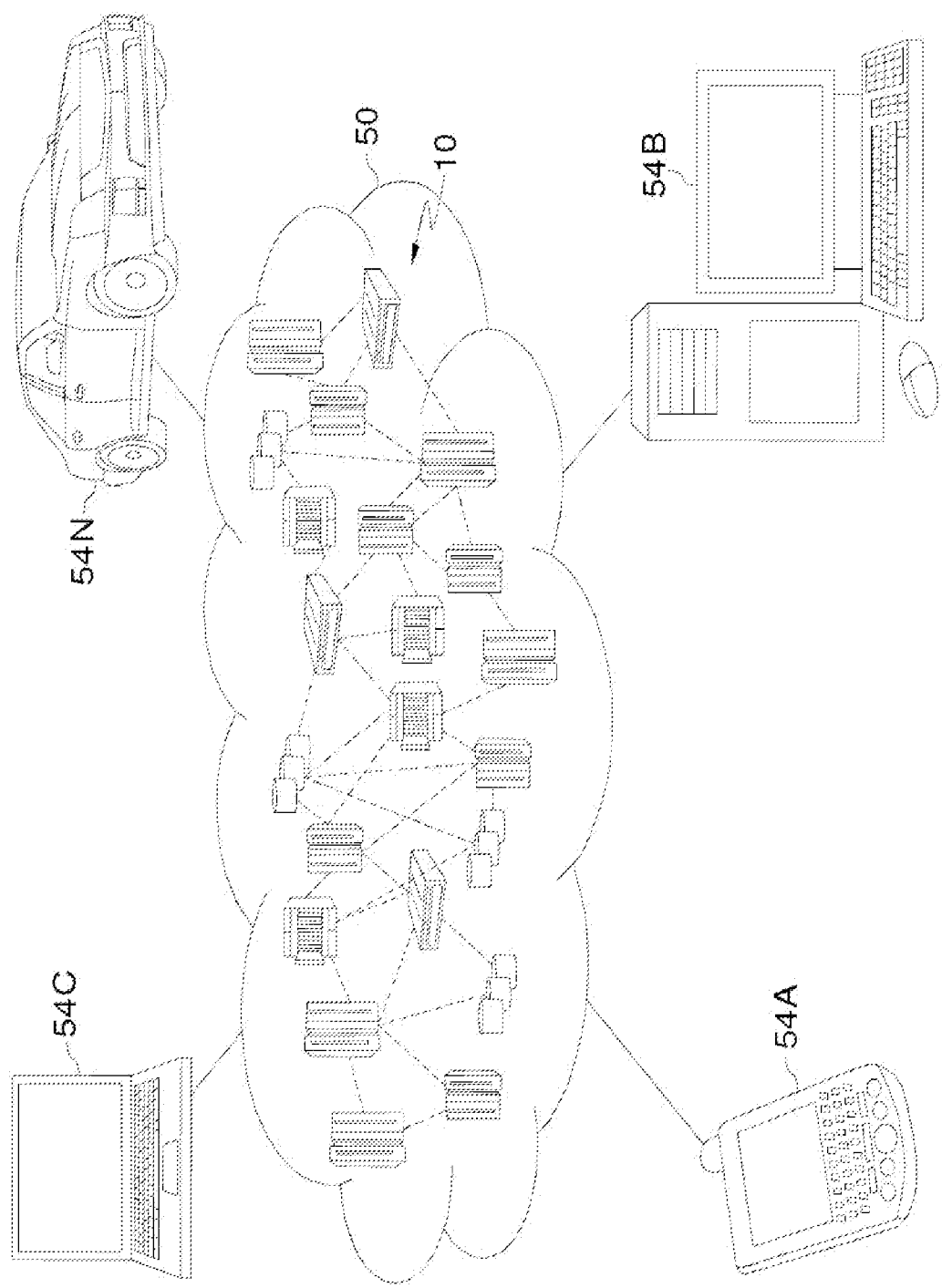
FIG. 1 depicts a cloud computing environment according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides for secure provisioning of unknown devices through trusted third-party devices. The present technology solves recognized secure network credentialing problems by providing new technology that includes a new form of credential provisioning for computing devices that are "unknown" within a given computing network or for which network access to a portion of a network has not been previously configured. The computer network may be a secure network or a secure portion of a network (e.g., a secure area of a network behind a firewall, etc.), or other network as appropriate for a given implementation. The technology described herein allows devices that would otherwise be unable to connect to a network or establish a connection with a credentialing system (e.g., a system registrar, etc.) within a secure network to acquire the appropriate network access credential(s) to gain access to the secure network or secure portion of the network. Unknown devices to which credentials may be provided include devices such as laptops, tablets, and Internet of Things (IoT) devices (e.g., watches, pedometers, building temperature sensors, electronic cash registers, refrigerators, etc.). The technology described herein allows the unknown device to acquire the network access credential(s) by communication and authentication with a "trusted" third-party device, or by communication and authentication with the credentialing system of the secure network through the trusted third-party device. For example, the technology described herein allows an unknown IoT device to issue a request using a Bluetooth® or other connection to a trusted smart phone, and the smart phone may evaluate the trustworthiness of the IoT device and, if found to be trustworthy, provide the appropriate Wireless Fidelity (WiFi or Wi Fi®) access credential to the IoT device. As such, the technology described herein may allow an unknown device to become trusted and rapidly obtain credentials by which to connect to a network that would be otherwise inaccessible by use of new multi-device computational processing techniques within complex secure network computing environments.

To implement the technology described herein, an organization may establish one or more trusted third-party devices with a proxy trust responsibility to act as the organization's trust proxy device(s). The trusted third-party device(s) may be established with a trust level sufficient for the trusted third-party device(s) to be responsible for making trust decisions, such as validating authenticity of an unknown device, and assessing and establishing the trustworthiness of the unknown device. If the unknown device is found by one or more of the trust proxy devices to meet the organization's definition of trustworthiness, a network access credential may be provided by the trust proxy device to the unknown (previously untrusted) device. The trusted device(s) may further operate as intermediary communications platforms that allow the unknown device to communicate by proxy with the credentialing system of the secure network to obtain the credential(s) directly from the credentialing system of the secure network.

The network access credential may be formed in any manner appropriate for a given implementation. For example, the network access credential may be formed as a digital certificate, or may be formed in another manner. The network access credential may further be configured as either temporary or long-lasting, as appropriate for a given implementation and the respective organization's preferences. Further regarding temporary network access credentials, time frames may be established for use of and access to a network, such as at a hotel or conference/event. In such an implementation, an unknown device may be validated and authorized by a trusted device to access the network for a timeframe coincident with the duration of the user's stay at a hotel or for the duration of the conference/event. Additionally, where the credential is a temporary credential, the temporary credential may be usable to request another credential for accessing a resource or system from a credentialing system. In such an implementation, the additional credential may be a credential that accesses a different portion of a secure system/network or may be a long-lasting credential. As such, many possibilities exist for granularly establishing ranges of time and access rights for unknown devices, and all such possibilities are considered to form a part of the technology described herein.

The network access credential may be unique to the specific unknown device, may be provided only for the purpose of login, may be provided on a one-time use basis, or may be a common credential used by the organization for all unknown devices. If the provided network access credential is temporary, then the untrusted device may be expected within an established temporary time limit to use this temporary credential in a formalized process of interaction(s) with the credential provisioning system or other device to perform addition device validation, such as to change/acquire a longer-term credential during a first login. In response to a more-formal validation, the credential provisioning system may provide additional or replacement credentials that are less limited to establish a more long-lasting network access credential. As such, the technology described herein may improve the technology of network access for unknown devices, while also being less complex, less time consuming, and less costly than conventional technologies.

Further, the technology described herein may be utilized to provide network access credentials to many types of unknown devices. Example device types include personal computers, smartphones, tablets, and other handheld devices. Additionally, the technology described herein may be utilized to provide network access credentials to Internet of Things (IoT) devices (e.g., watches, pedometers, building temperature sensors, electronic cash registers, refrigerators, etc.). The technology described herein may also be utilized in association with a Software as a Service (SaaS) implemented within a cloud computing environment that interacts with distributed sensors that provide network access to unknown devices. For example, a cloud computing-based building management application that interacts with and manages network access sensors at a coffee shop, cafeteria, sandwich shop, or other public area may implement the secure provisioning of unknown devices through trusted third-party devices described herein. Within such an implementation, unknown devices may be authenticated to access a network provided within the coffee shop, sandwich shop, or other public area by use of a WiFi network connection.

Regarding network partitioning to allow limited unknown device access for purposes of further authentication efforts, technologies may be used to place the unknown device within a "special" trust zone, where additional authentications may be performed. For example, use of software defined networking (SDN) may be leveraged to reconfigure the network to which the device is to connect such that the network only allows access to a controlled area (e.g., the "new guy" on the block subnet). Within this controlled area the credentialing system may perform further authentications and provide longer-term credentials.

Identification of trusted devices by unknown devices seeking a connection may be performed in any manner appropriate for a given implementation. For example, an untrusted device that has Bluetooth® communication capabilities may issue a broadcast query for trusted devices in proximity with the untrusted device to respond and assist with authentication on the network. Alternatively, and using the coffee shop example, IoT sensors within a building may be configured with a list of devices from which to accept trust requests, and these sensors may accept requests for trust responses from anyone that walks in with a device manufactured by a particular mobile phone manufacturer (trademarks intentionally omitted). An unknown device of a person that walks into the coffee shop may be provided with a temporary proxy of trust if the unknown device is on the approved list. As another alternative, and again using the coffee shop example, the coffee shop may post a sign that indicates that devices must be authenticated through an IoT device (e.g., a building temperature sensor, electronic cash register, or other IoT device) prior to being able to access the coffee shop's Internet access point, and a user of the unknown device may view a list of available wireless connections and prompt the unknown device to interact with a specified device from the list that is identified as active within the coffee shop. As such, many technological alternatives for unknown devices to identify trusted devices through with to become authorized to access a network are possible, and all such technological alternatives are considered within the scope of the technology described herein.

It should be noted that the technology described herein may be applied in a layered manner. For example, were sensitive information or information technology (IT) assets are accessible within the secure network, stronger authentication methods and potentially multiple authentication methods may be utilized along a validation path to full provisioning of an authentication credential to an unknown device.

Additionally, one or more trusted devices may be utilized to authenticate an unknown device, as appropriate for a given implementation. Where more than one trusted device is available and/or configured for authentication of unknown devices, multiple-device authentication (e.g., voting) may be performed among the trusted devices as part of authentication of an unknown device. Once an unknown device is authenticated, a trusted device may update the enterprise authority with attributes of the newly-trusted (previously unknown) device.

As an example of single trusted device authentication of an unknown device, it may be presumed that "Device A" is trusted by organization, and "Device X" is not known to the organization. Network authentication rules for determining whether an unknown device is to be trusted may be established and given to Device A. Unknown Device X may identify trusted devices within proximity of Device X by any manner appropriate for a given implementation, such as identifying and determining it has a connection (e.g., Bluetooth®, etc.) to Device A (or another device). Once a trusted device is identified by Device X, Device X may ask Device A to trust Device X, and thereby assist Device X with access to a different (e.g., secure) network. Based on the defined/configured rules, Device A may evaluate the trustworthiness of Device X. If Device X is determined by Device A to be trustworthy, then Device A may give unknown Device X a credential usable to access the different/secure network. This credential may be a temporary credential or limited use credential or may be a full-use credential. The credential may be obtained from a registrar or other enterprise authority at the time of the request from unknown Device X, may be pre-obtained by Device A, or may be pre-established across the organization (e.g., a password of the day). Device A may convey the attributes of the previously untrusted Device X to the respective enterprise authority, and the enterprise authority may configure access to the secure network by Device X. Device X may then utilize the credential to access the secure network. Alternatively and/or optionally, Device X may utilize the credential to request another credential from the enterprise authority, in response to which the enterprise authority may optionally apply additional validation methods to further scrutinize access to the secure network by Device X, and may provide Device X with another credential in response to Device X passing the additional validation methods.

Regarding multiple-device authentication, a collection of trusted devices may jointly/collaboratively evaluate and "vote" regarding whether the unknown device meets the trust standards of the enterprise organization. If the trust vote passes, then one of the voting devices may provide the network access credential to the unknown device.

As an example of use of a multiple-device authentication of an unknown device, it may be presumed that "Device A," "Device B," "Device C," and "Device D" (hereinafter "Devices A-D") are trusted by the organization, and that again "Device X" is not known to the organization. In this case, rules may also be established for use in determining whether an unknown device may be trusted and given to each of Devices A-D. Unknown Device X may identify and determine it has a connection (e.g., Bluetooth®, etc.) to one or more of Devices A-D, and may ask any or all of Devices A-D to trust Device X, and thereby assist Device X with access to a secure network. Based again on the defined/configured rules, each trusted Devices A-D may independently evaluate the trustworthiness of Device X. The trusted Devices A-D may further inter-communicate to share their independent determinations, as appropriate for a given implementation. If an enterprise-defined number or percentage of these trusted devices determine that Device X is trustworthy, then any of the trusted Devices A-D may give unknown Device X a credential usable to access the different/secure network. As with the description above, this credential may be a temporary credential or limited use credential or may be a full-use credential. The credential may be obtained from the registrar or other enterprise authority at the time of the request from unknown Device X, may be pre-obtained by the respective trusted Devices A-D, or may be pre-established across the organization (e.g., a password of the day). Any of the trusted Devices A-D may convey the attributes of the previously untrusted Device X to the respective enterprise authority, and the enterprise authority may configure access to the secure network by Device X. Device X may then utilize the credential to access the secure network. Alternatively and/or optionally, Device X may utilize the credential to request another credential from the enterprise authority, in response to which the enterprise authority may optionally apply additional validation methods to further scrutinize access to the secure network by Device X, and may provide Device X with another credential in response to Device X passing the additional validation methods.

It should be noted that each of the single trusted device authentication and the multiple-device authentication will be described in more detail further below. The technology may be implemented as software within the trusted device(s) in combination with an enterprise trust policy, and may be potentially managed from a central location.

Certain terms and definitions are utilized in the description below to represent trust evaluation criteria. Trust evaluation criteria as described herein represent each of device characteristics associated with unknown devices (alternatively termed device "evaluation attributes"), trust evaluation types (e.g., binary, voting, etc. as described in more detail below), and trust evaluation rules/algorithms. The device characteristics associated with unknown devices may be utilized by one or more trusted devices by execution of one or more trust evaluation rules/algorithms to evaluate the trustworthiness of the unknown device.

An "Evaluation_attribute" (alternatively "evaluation attribute") represents a measurable factor of a device that an organization has defined as usable to evaluate the trustworthiness of an unknown device. The term "Evaluation_attribute_value" (alternatively "evaluation attribute value") represents a value of a particular evaluation attribute established by the organization that must be met by a particular unknown device. The term "Evaluation_attribute_point_value" (alternatively "evaluation attribute point value") represents a configured significance (relative ranking/weight) assigned by the organization to the configured evaluation attributes. The term "Accumulated_total_point_value" (alternatively "accumulated total point value") represents a variable that captures a total point value accumulated by evaluation of all of the relevant/configured attributes of the unknown device. The term "Evaluation_attributes_Boolean_expression" (alternatively "evaluation attributes Boolean expression") represents a binary trust approach by which a trust evaluation rule or algorithm may evaluate the respective evaluation attributes into a binary output value (e.g., true or false).

The following TABLE 1 illustrates example characteristics associated with unknown devices that may be utilized by one or more trusted devices for evaluation of the trustworthiness of the unknown device:

TABLE 1

Example Device Characteristics Usable for Trust Evaluation

| Evaluation_attribute: | Evaluation_attribute_value: | Evaluation_attribute_point_value: |
|---|---|---|
| Physical location | Latitude 36.002, Longitude −79.024, Elevation 400' | 10 |

TABLE 1-continued

Example Device Characteristics Usable for Trust Evaluation

| Evaluation_attribute: | Evaluation_attribute_value: | Evaluation_attribute_point_value: |
|---|---|---|
| Logical location | WiFi access point: RTP-002-AP13 | 30 |
| Time of day/ day of week | Non-holiday, prime shift week days | 40 |
| Device type | Specified Manufacturer and/or Model of Device | 10 |
| Alternative credential | Certificate from an authorized certificate authority | 300 |

As can be seen from TABLE 1, a variety of device characteristics may be configured and utilized for validation of unknown devices. These device characteristics may be specified as appropriate for a given implementation, and as a result the example list above is not to be considered exhaustive of all possible device characteristics that may be utilized within a given implementation of the technology described herein.

Several approaches to unknown device approval are possible. For example, a cumulative weight trust approach may utilize cumulative weights according to cumulative evaluation attribute point values. A binary trust approach may utilize binary evaluation of evaluation attributes (e.g., true or false). As introduced above, a voting trust approach may apply either cumulative or binary trust evaluation at and among multiple trusted devices.

Regarding configuration of trusted devices in preparation for runtime authentication of untrusted devices, the following threshold configurations may be performed with reference to the device characteristics of TABLE 1. For the cumulative trust approach, the trusted device may receive and be configured with a list of evaluation attributes, respective evaluation attribute values of the attributes, evaluation attribute point values of the attributes, a minimum accumulated required point value, and a credential to provide to the untrusted device or a method to request the credential from a registrar during runtime when/as needed. For the binary trust approach, the trusted device may receive and be configured with a list of evaluation attributes, respective evaluation attribute values of the attributes, evaluation attribute point values of the attributes, logical combination rules, and a credential to provide to the untrusted device or a method to request the credential from a registrar during runtime when/as needed. For the voting trust approach, either cumulative weighting or binary voting may be utilized, and the trusted device may receive/identity other (voting) trusted devices. The vote evaluation device may be identified using a specific device designation (e.g., the device serial number), or may be identified using a configured vote resolution rule (e.g., the device with the highest value serial number), or otherwise as appropriate for a given implementation.

With the foundational definitions provided above, and using the binary trust approach for purposes of example, each evaluation attribute may evaluated as a binary value (e.g., true or false). As such, and utilizing the examples of TABLE 1, if the unknown device's respective attribute equals (e.g., =) the configured evaluation attribute value, the evaluation of the respective value would be true. Otherwise, the evaluation of the respective value would be false.

Further regarding specification of evaluation rules, each binary attribute may be specified with a logical combination rule. An "approval" rule may be configured in a variety of ways. For example, an approval rule may be specified to approve the unknown device if the configured physical location and configured the logical location each match those provided by the unknown device (e.g., approve if (physical location=true) & (logical location=true)). As another alternative, an approval rule may be specified to approve the unknown device if the configured the logical location or (logical "or") the configured device radio identifier (ID) each match those provided by the unknown device, or (logical "or") the configured certificate originator and (logical "and") the configured time respectively match the certificate provided by the unknown device and the time of day matches the time of attempted access by the unknown device (e.g., approve if (logical location=true) or (device radio ID=4AB389F37), or approve if (other credential=true) and (time is between 7 AM and 5 PM)).

The above example approval rules provide sufficient detail to show that the complexity of approval rules may be as varied as appropriate for a given implementation. Many other approval rules and logical combinations of evaluation attributes are possible, and all such approval rules and logical combinations of evaluation attributes are considered within the scope of the present description.

The technology described herein operates by providing a trusted device responsible for evaluating trustworthiness of unknown devices. Trust evaluation rules usable to determine whether to authorize unknown devices to access a resource are received. A request to access the resource and device evaluation attributes are received from an unknown device. The trustworthiness of the unknown device is evaluated based upon the device evaluation attributes using the trust evaluation rules. In response to determining that the unknown device is trustworthy, a credential for accessing the resource is provided to the unknown device, and the device evaluation attributes of the unknown device and an identification of the unknown device are sent to a registrar for the resource.

It should be noted that conception of the present subject matter resulted from recognition of certain limitations associated with provisioning of unknown devices within secure network environments. For example, it was observed that, within conventional networking environments, the provisioning of credentials into some devices is difficult or impossible if the unknown device is not within the communications domain of the credentialing system, or if the credentialing system does not have a communications method/technology by which to directly connect to and provide a credential to the unknown device. It was observed that these types of situations that may prevent provisioning of credentials to devices may occur for a variety of reasons, such as where the unknown device is at home instead of at the appropriate corporate location, where the device is located at a corporate location that does not have connectivity to the credential provisioning system, or where the device needs the credential to connect to the corporate intranet to reach the credentialing system. To further this example, if the device is an Internet of Things (IoT) device capable of communicating only via Bluetooth® and Wireless Fidelity (WiFi or Wi Fi®), and as a result this IoT device does not have a communication interface that is capable of reaching the credential provisioning system using a standard network connection (e.g., no Ethernet port), then the IoT device would be unable to connect to the credential provisioning system to obtain the appropriate credential(s) to access the network using either Bluetooth® or WiFi. The technology described herein allows a device, under such circumstances, to issue a request using Bluetooth® or other connection to a trusted smart phone, and the smart phone may evaluate the trustworthiness of the IoT device and, if found to be trustworthy, provide the appropriate WiFi access credential to the IoT device. Certain other conventional technologies require and rely upon authorized personnel that are designated to physically obtain and provision a credential for a device. However, this type of manual processing results in credential provisioning delays and may result in credential provisioning errors. Further, under this type of conventional credential provisioning approach, the device is typically connected directly to the credential provisioning system, which imposes security risks within the secure network. The present subject matter solves these forms of technological problems, as described herein, and as a result improves technology for provisioning of unknown devices within secure network environments by providing for secure provisioning of unknown devices through trusted third-party devices, as described above and in more detail below. As such, improved secure provisioning of unknown devices within secure networks may be obtained through use of the present technology.

The technology described herein for secure provisioning of unknown devices through trusted third-party devices may be performed in real time to allow prompt provisioning of unknown devices within one or more secure networks. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additional details of the algorithmic processing and computational efficiencies will be provided further below. The following portion of the present description provides examples of advanced computational platform(s) within which the present technology may be implemented, followed by further details of secure provisioning of unknown devices through trusted third-party devices.

It should be noted that the present technology may be implemented within or as part of a cloud computing environment (e.g., as a SaaS service, etc.), or may be implemented as a customized environment-specific solution. As such, examples of implementations for both environments are included herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
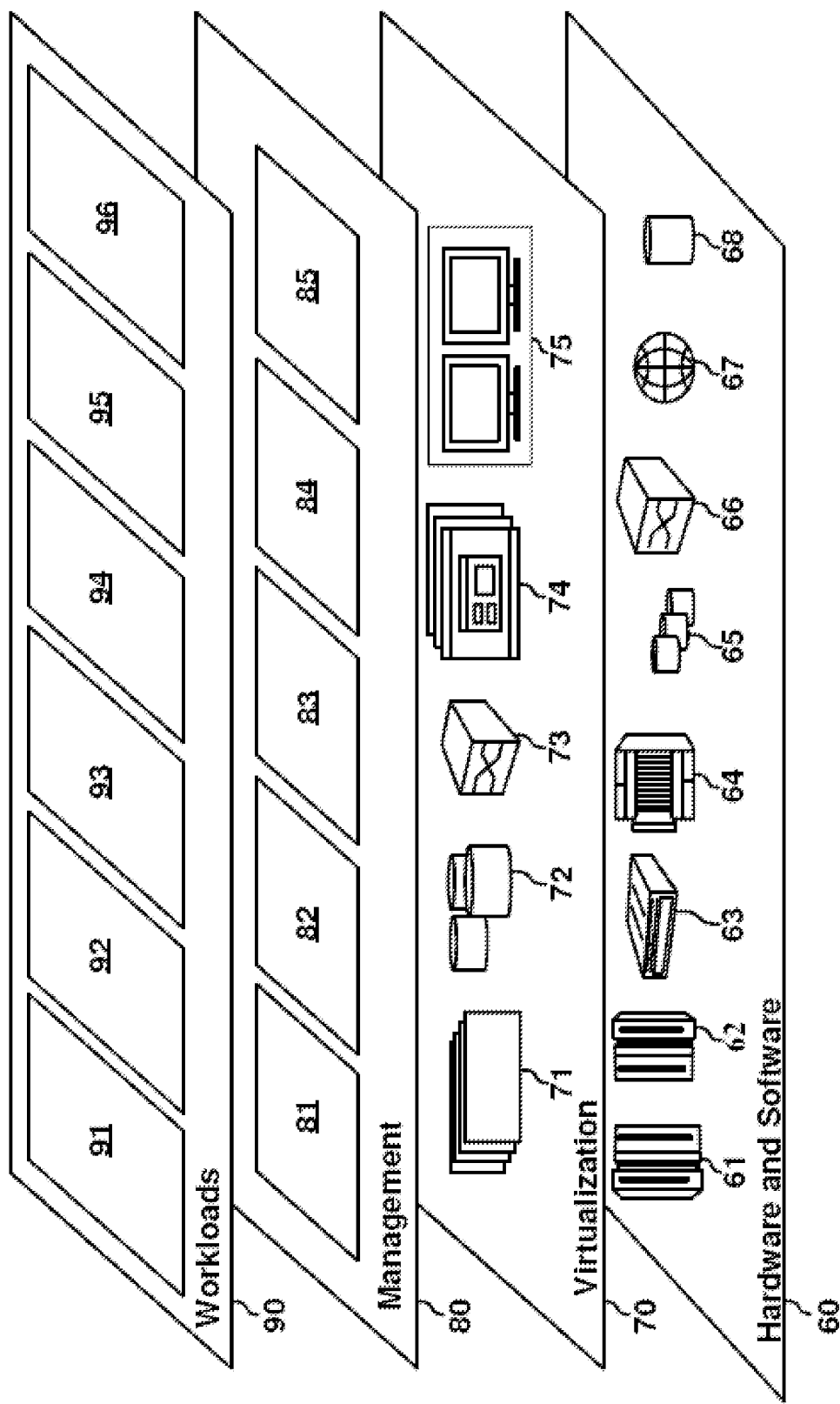
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure provisioning of unknown devices through trusted third-party devices 96.

Regarding alternative platform implementation options, FIGS. 3 and 4 below are directed to such alternatives. It should be understood that the various alternatives may be combined with or substituted with the implementation options described above and below, as appropriate for the given implementation.

Figure 3:
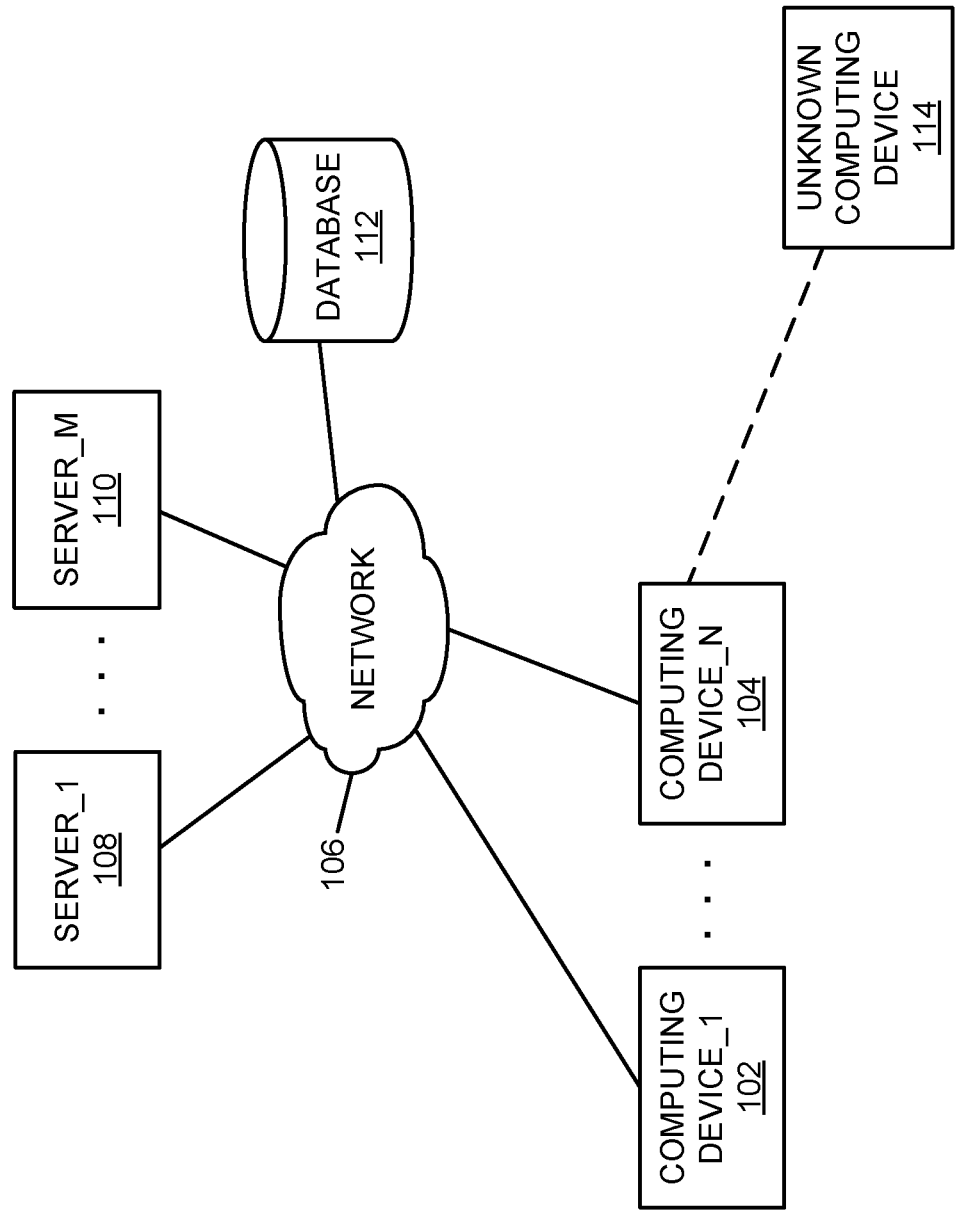
FIG. 3 is a block diagram of an example of an implementation of an alternative system for secure provisioning of unknown devices through trusted third-party devices according to an embodiment of the present subject matter.

FIG. 3 is a block diagram of an example of an implementation of an alternative system 100 for secure provisioning of unknown devices through trusted third-party devices. A computing device_1 102 through a computing device_N 104 communicate via a network 106 with several other devices. The other devices include a server_1 108 through a server_M 110. A database 112 provides storage for information, such as credentials, trust access rules, authorized device type lists, and other information usable as described herein. An unknown computing device 114 is shown within the system 100, but it is not connected (at least initially) through the network 106 to any of the server_1 108 through the server_M 110 or the database 112.

As will be described in more detail below in association with FIG. 4 through FIG. 6B, the computing device_1 102 through the computing device_N 104 may each be considered "trusted" devices, and may provide, in combination with the server_1 108 through the server_M 110, automated secure provisioning of unknown devices through trusted third-party devices. The automated secure provisioning of unknown devices through trusted third-party devices is based upon collaborative processing and delegation of trust decision authority to one or more of the computing device_1 102 through the computing device_N 104 to evaluate and grant access to unknown devices that request access via the network 106 to one or more of the server_1 108 through the server_M 110.

For purposes of the present technology, it is assumed that the unknown device 114 has technological interconnection capabilities to the network 106, but that the unknown device 114 does not have proper credentials to access the network 106 or a portion thereof, which is why the unknown device 114 is considered to be unknown within the network 106.

A dashed-line interconnection is shown between the unknown computing device 114 and the computing device_N 104. This dashed-line interconnection represents a wireless connection within this example to one or more of the computing device_1 102 through the computing device_N 104 that operate as trusted devices within the system 100. As described above and in more detail below, the unknown computing device 114 may interact with the computing device_1 102 through the computing device_N 104 to request a trust relationship within the network 106. Any of the computing device_1 102 through the computing device_N 104 may either individually make trust decisions or may collaboratively vote with respect to allowing the unknown computing device 114 to access the network 106.

In view of the implementation alternatives described above, the present technology may be implemented within a cloud computing platform, at a user computing device, at a server device level, or by a combination of such platforms and devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, or eventually by the unknown computing device 114, via a network, such as the network 106. As such, the server_1 108 through the server_M 110 may each include a web server, application server, or other data server device. Additionally, one or more of the server_1 108 through the server_M 110 may operate as a credentialing system, and may delegate trust authorization for the unknown computing device 114 to one or more of the respective computing device_1 102 through the computing device_N 104.

The database 112 may include a relational database, an object database, or any other storage type of device. As such, the database 112 may be implemented as appropriate for a given implementation.

Figure 4:
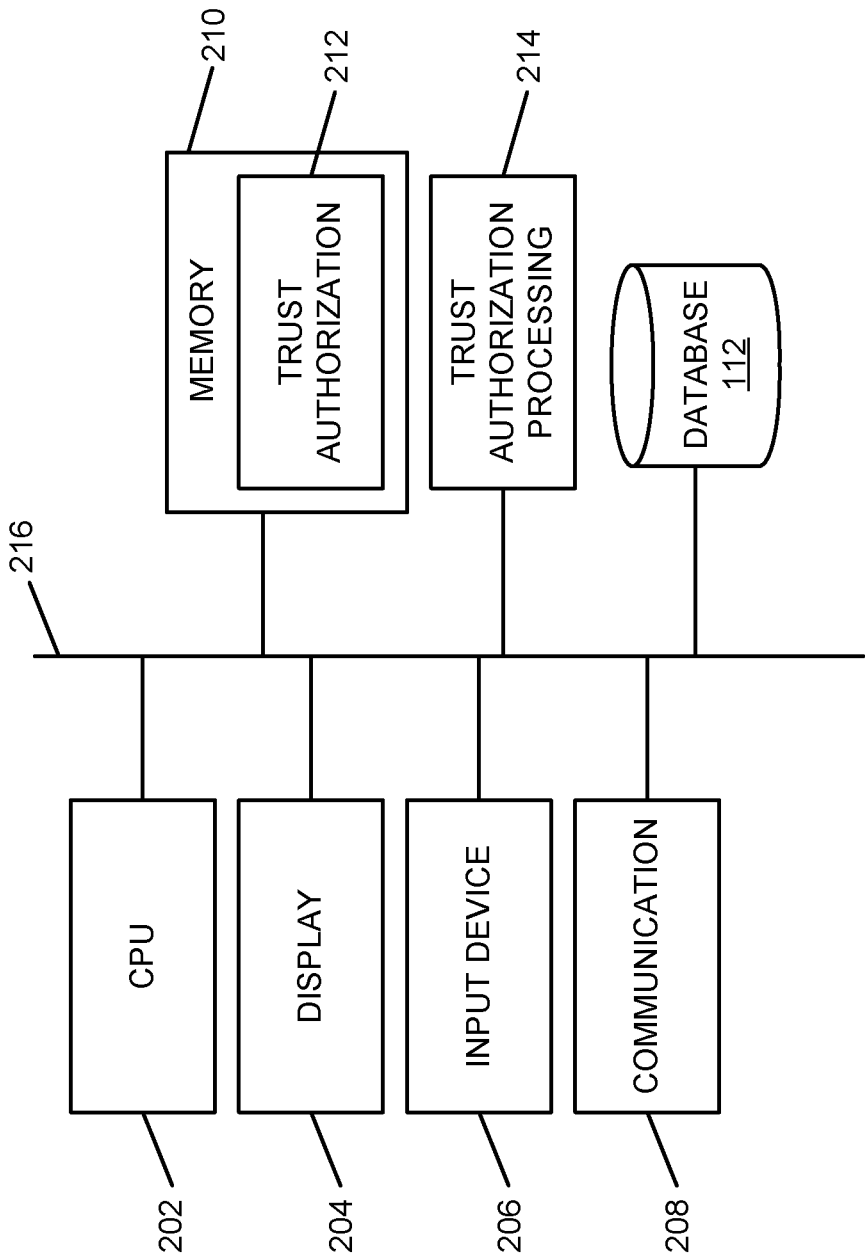
FIG. 4 is a block diagram of an example of an implementation of a core processing module capable of performing secure provisioning of unknown devices through trusted third-party devices according to an embodiment of the present subject matter.

FIG. 4 is a block diagram of an example of an implementation of a core processing module 200 capable of performing secure provisioning of unknown devices through trusted third-party devices. The core processing module 200 may be associated with either the computing device_1 102 through the computing device_N 104, with the server_1 108 through the server_M 110, with the unknown computing device 114, or with devices within the cloud computing environment 50, as appropriate for a given implementation. As such, the core processing module 200 is described generally herein, though it is understood that many variations on implementation of the components within the core processing module 200 are possible and all such variations are within the scope of the present subject matter. It is understood that certain aspects of the core processing module 200 related to trust management may not be implemented within an unknown computing device, or that complementary operations may be performed by the unknown computing device to issue trust requests to one or more trusted devices. Further, the core processing module 200 may be implemented as an embedded processing device with circuitry designed specifically to perform the processing described herein as appropriate for a given implementation.

Further, the core processing module 200 may provide different and complementary processing of trust relationship authorization(s) in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor" or "application-specific" processor) provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100, or within the cloud computing environment 50, as appropriate for a given implementation. The communication module 208 may include any electrical, protocol, and protocol conversion capabilities useable to provide interconnection capabilities, as appropriate for a given implementation. As such, the communication module 208 represents a communication device capable of carrying out communications with other devices. The communication module 208 may further include one or more wireless communication capabilities, as appropriate for the given implementation.

A memory 210 includes a trust authorization storage area 212 that stores trust authorization rules and results within the core processing module 200. As will be described in more detail below, information stored within the trust authorization storage area 212 is used to request or grant trust decisions, respectively, depending upon whether the core processing module is associated with the unknown computing device 114 (to request trust) or is associated with one of the other computing devices (trusted devices) within the system 100 or the cloud computing environment 50.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A trust authorization processing module 214 is also illustrated. The trust authorization processing module 214 provides programmatic processing for the core processing module 200, as described above and in more detail below. The trust authorization processing module 214 implements the automated secure provisioning of unknown devices through trusted third-party devices of the core processing module 200.

It should also be noted that the trust authorization processing module 214 may form a portion of other circuitry described without departure from the scope of the present subject matter. The trust authorization processing module 214 may form a portion of an interrupt service routine (ISR), a portion of an operating system, or a portion of an application without departure from the scope of the present subject matter. The trust authorization processing module 214 may also include an embedded device with circuitry designed specifically to perform the processing described herein as appropriate for a given implementation.

The database 112 is again shown within FIG. 4 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the trust authorization processing module 214, and the database 112 are interconnected via an interconnection 216. The interconnection 216 may include a system bus, a network, or any other interconnection capable of providing the respective components with suitable interconnection for the respective purpose.

Though the different modules illustrated within FIG. 4 are illustrated as component-level modules for ease of illustration and description purposes, it should be noted that these modules may include any hardware, programmed processor (s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 5:
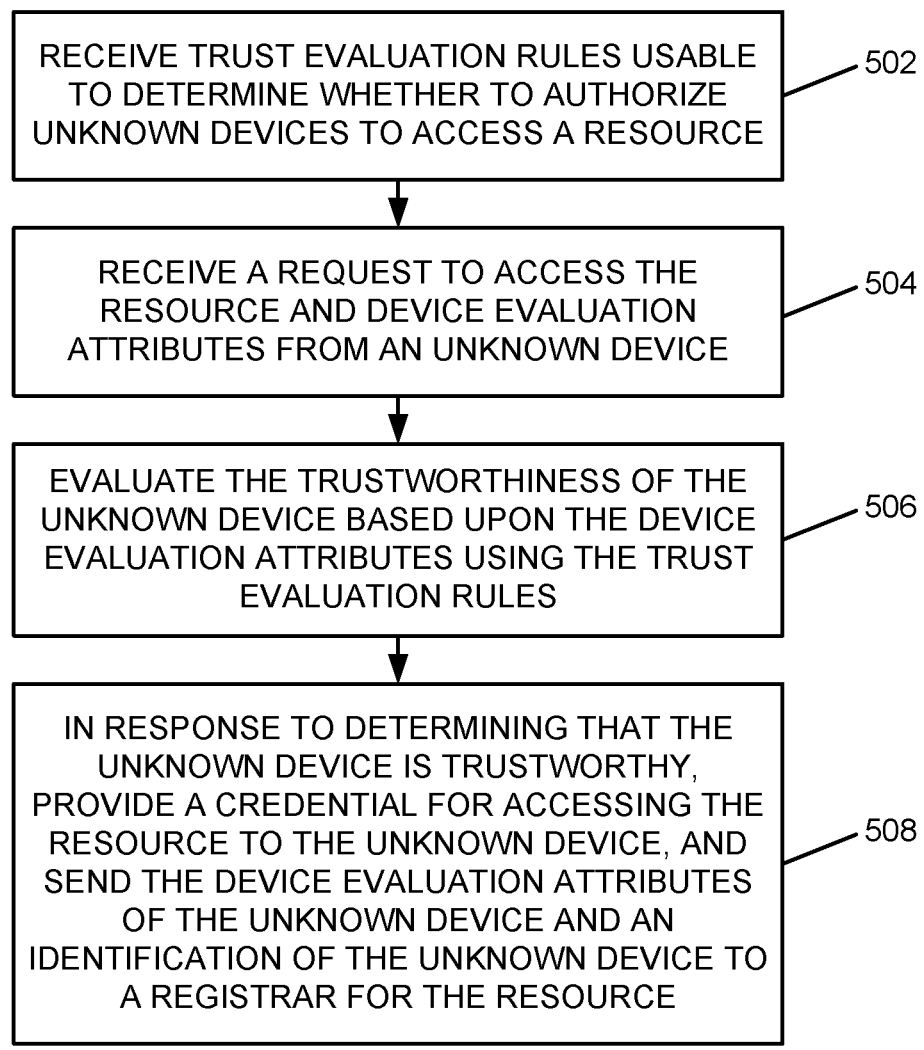
FIG. 5 is a flow chart of an example of an implementation of a process for automated secure provisioning of unknown devices through trusted third-party devices according to an embodiment of the present subject matter.
Figure 6A:
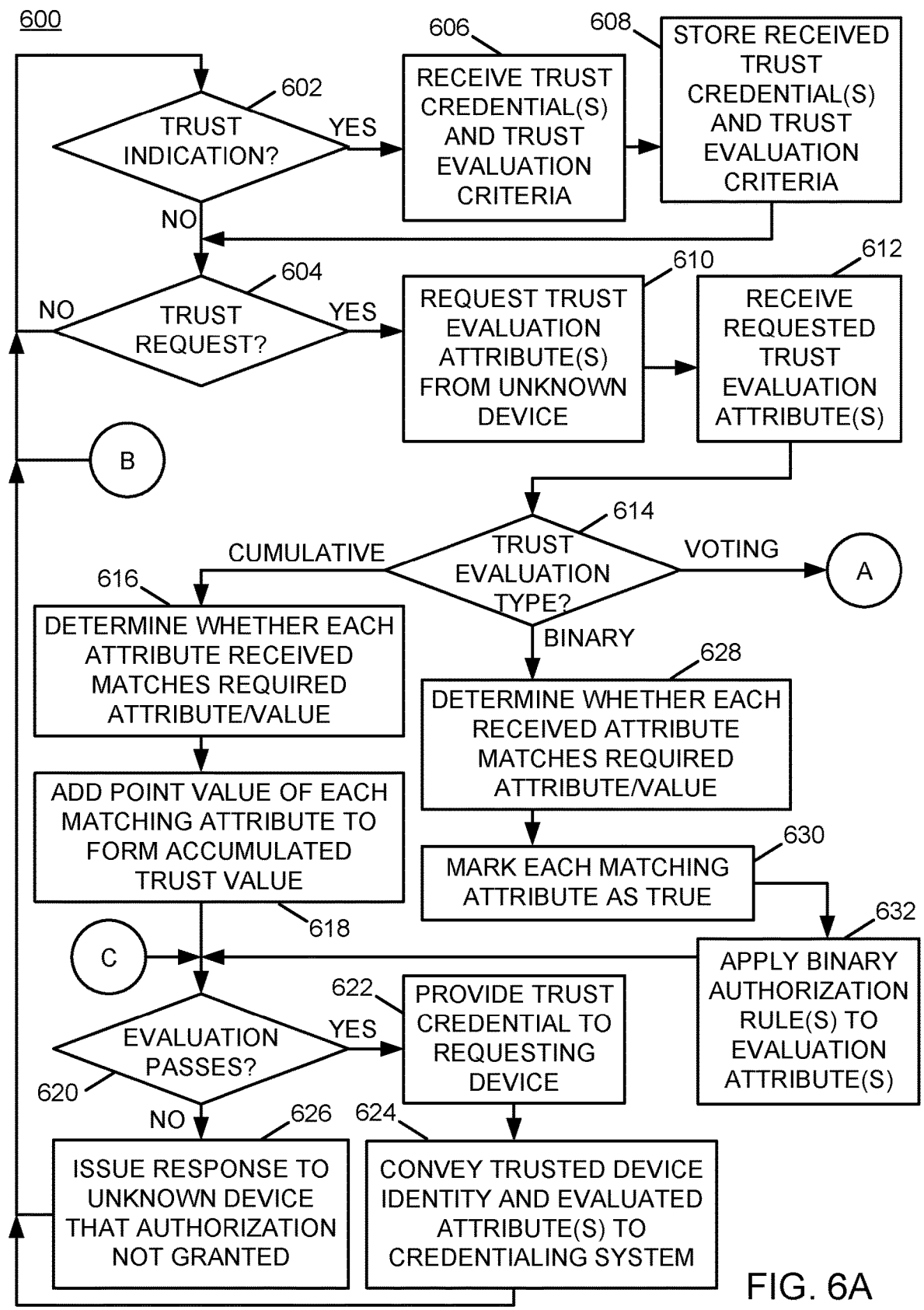
FIG. 6A is a flow chart of an example of an implementation of initial processing within a process for secure provisioning of unknown devices through trusted third-party devices at a trusted computing device according to an embodiment of the present subject matter.
Figure 6B:
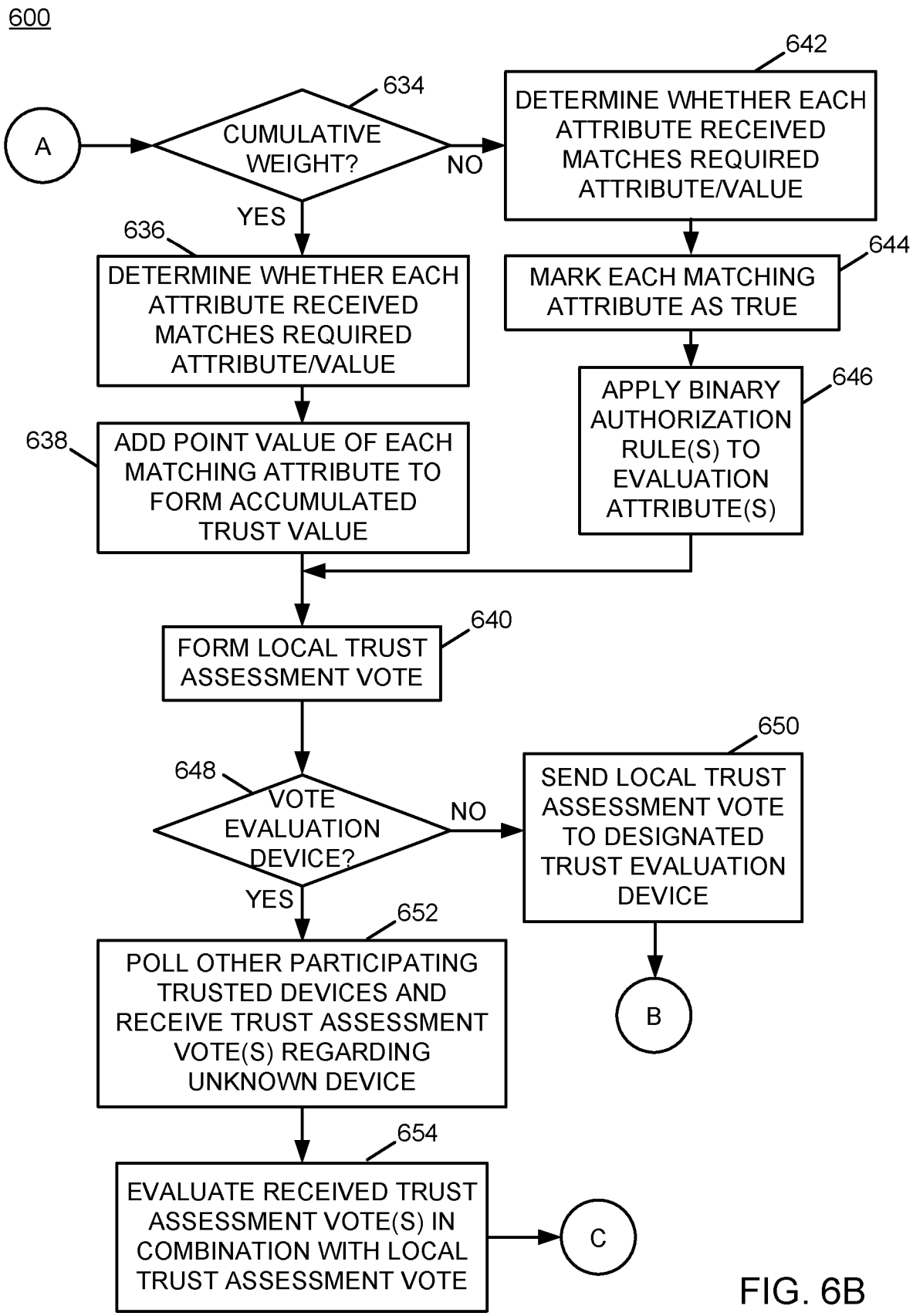
FIG. 6B is a flow chart of an example of an implementation of additional processing within a process for secure provisioning of unknown devices through trusted third-party devices at a trusted computing device according to an embodiment of the present subject matter.

FIG. 5 through FIG. 6B described below represent example processes that may be executed by devices, such as the core processing module 200, to perform the automated secure provisioning of unknown devices through trusted third-party devices associated with the present subject matter. Many other variations on the example processes are possible and all are considered within the scope of the present subject matter. The example processes may be performed by modules, such as the trust authorization processing module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 5 is a flow chart of an example of an implementation of a process 500 for automated secure provisioning of unknown devices through trusted third-party devices. The process 500 represents a computer-implemented method of performing the trust authorization processing described herein. At block 502, the process 500 receives trust evaluation rules usable to determine whether to authorize unknown devices to access a resource. At block 504, the process 500 receives a request to access the resource and device evaluation attributes from an unknown device. At block 506, the process 500 evaluates the trustworthiness of the unknown device based upon the device evaluation attributes using the trust evaluation rules. At block 508, the process 500, in response to determining that the unknown device is trustworthy, provides a credential for accessing the resource to the unknown device, and sends the device evaluation attributes of the unknown device and an identification of the unknown device to a registrar for the resource.

FIGS. 6A-6B illustrate a flow chart of an example of an implementation of process 600 for secure provisioning of unknown devices through trusted third-party devices at a "trusted" computing device. The process 600 represents a computer-implemented method of performing the trust authorization processing described herein. It is further noted, as described above, that any aspect of functionality described with respect to any one device that is described in conjunction with another device (e.g., sends/sending, etc.) is to be understood to concurrently describe the functionality of the other respective device (e.g., receives/receiving, etc.). As such, the process 600 represents and illustrates example processing at the server_1 108 through the server_M 110 and at the unknown device 114 by nature of the various sending/receiving processing steps that result in or are responsive to processing at these respective devices. This single FIG. 6 is provided for compactness in the description herein.

FIG. 6A illustrates initial processing within the process 600. The process 600 begins iterative processing between two primary decision points 602 and 604. At decision point 602, the process 600 makes a determination as to whether a trust indication has been received from a credentialing system to indicate that the computing device executing the process 600 is a designated "trusted" device within the respective system. It should be noted that a trust indication may add or remove either the current device or another device from "trusted" status, either temporarily or permanently, as appropriate for a given implementation. As such, the process 600 may operate to establish and withdraw trust authority for devices as devices that are capable of or recognized as trust decision-making devices enter and leave a particular network area (e.g., a coffee shop, cafeteria, etc.). In view of the multi-device processing being described in association with the process 600 for trust designations and voting evaluation, the following description on occasion utilizes the term "current device" to represent a perspective of a particular device that is making a particular decision.

In response to determining at decision point 602 that a trust indication has been received from a credentialing system, the process 600 receives at block 606 one or more trust credential(s) and trust evaluation criteria, as described in detail above. The trust credentials may add or remove the current device or one or more other devices from trusted status. The trust credentials may further detail particular trust evaluation criteria and one or more trust evaluation types (e.g., cumulative, binary, voting, etc.) It should also be noted that for a voting implementation, the trust evaluation criteria may additionally indicate that a particular device is the designated vote evaluation device among a voting group of trusted voting devices. The particular device may be the current device or another device in the voting group.

At block 608, the process 600 stores the received trust credential(s) and trust evaluation criteria. Storage of the received trust credential(s) may include establishing or overwriting/deleting a particular trust designation, as appropriate for the particular trust indication. The process 600 proceeds to decision point 604 and iterates as described above and below.

Returning to decision point 602, in response to determining that a trust indication has not been received, the process 600 makes a determination at decision point 604 as to whether a trust request has been received from an unknown device. It should be noted that processing of trust requests is delegated to devices with a "trusted" designation/status. As such, where a trust indication that designates the current device as a designated trusted device has not been previously received and a trust request is received, the process 600 may disregard the trust request or respond with a negative acknowledgement/response, as appropriate for a given implementation. These options are not illustrated to reduce crowding within the drawing, but are considered a part/portion of the process 600. In response to determining at decision point 604 that a trust request has not been received or that processing of a trust request is not appropriate in view of no prior receipt of a trust indication that designates the current device as a designated trusted device, the process 600 returns to decision point 602 and iterates as described above.

It should further be noted that, while the example processing in FIG. 6A details obtaining the trust credential(s) and trust evaluation criteria in association with receipt of a trust indication, the processing to obtain the trust credential(s) and trust evaluation criteria may be performed in response to a trusted device receiving a request to access the resource from an unknown device. As such, devices that were not previously designated as trusted devices may receive trust requests and the processing at decision point 604 may additionally transition to block 606 to request and receive the trust credential(s) and trust evaluation criteria, as appropriate for a given implementation.

Returning to the description of decision point 604, it will be presumed for purposes of description that the current device for which the determination is currently being made is designated as a "trusted" device, and that the current device may alternatively be configured as the vote evaluation device. Additional detail of this latter form of processing for voting resolution is described below in association with FIG. 6B.

In response to determining at decision point 604 that a trust request has been received from an unknown device and that the current device is designated as a trusted device (either an individual trusted device or one of a voting group of trusted devices), the process 600 requests trust evaluation attribute(s) from the unknown device at block 610. As described in detail above, trust evaluation attributes represent one or more measurable factors of a device that an organization has defined as usable to evaluate the trustworthiness of an unknown device. It is presumed that the requested trust attribute(s) are sent by the unknown device in response to the request. At block 612, the process 600 receives the requested trust attribute(s).

At decision point 614, the process 600 makes a determination regarding which trust evaluation type has been specified. As described in detail above, the trust evaluation types may be cumulative, binary, voting, or a combination/permutation of these trust evaluation types. For purposes of the example process 600, the trust evaluation types are considered to be one of the cumulative, binary, or voting trust evaluation types. Further, the trust evaluation type may be configured to be different for each trust authorization request. For example, where one or more additional trusted devices enter a network, the trust evaluation type may switch from either cumulative or binary to voting. As such, many possibilities for configuration and adjustment of trust evaluation types over time are possible, and all are considered within the scope of the present technology.

In response to determining at decision point 614 that the current/configured trust evaluation type is cumulative, the process 600 determines at block 616 whether each trust evaluation attribute received from the unknown device matches the required trust evaluation attribute and value specified for grant of trust to the unknown device. This processing of trust evaluation attributes may iterate across the respective set of trust evaluation attributes. It should be noted that, as a configuration option, the process 600 may not require all trust evaluation attributes to match. At block 618, the process 600 adds the respective point value of each matching attribute to form an accumulated trust value.

It should be noted that processing of several different branches of the process 600 converge below block 618 within FIG. 6A. Each of these branches will be described below, and each branch converges to decision point 620.

At decision point 620, the process 600 determines whether the respective trust evaluation (of several different types, as described below) passes. With respect to the current iteration and branch of processing, the process 600 makes a determination at decision point 620 as to whether the accumulated trust value determined using the cumulative trust evaluation type meets a threshold trust value established for granting trust to the unknown device. In response to determining that the respective trust evaluation passes, the process 600 provides a trust credential to the requesting device at block 622. As described above, the provided trust credential may be temporary or permanent, as appropriate for a given implementation. At block 624, the process 600 conveys the (newly) trusted device identity/identifier and the evaluated trust attributes to the credentialing system.

Returning to the description of decision point 620, in response to determining that the respective trust evaluation does not pass, the process 600 issues a response to the requesting unknown device that authorization (trust) is not granted at block 626. In response to either conveying the (newly) trusted device identity/identifier and the evaluated trust attributes to the credentialing system at block 624 or in response to issuing the response to the requesting unknown device that authorization (trust) is not granted at block 626, the process 600 returns to decision point 602 and iterates as described above.

Returning to the description of decision point 614, in response to determining that the trust evaluation type is binary, the process 600 determines at block 628 whether each received trust evaluation attribute matches the request trust evaluation attribute and value specified for grant of trust to the unknown device. At block 630, the process 600 marks each matching attribute as true. As an option, the process 600 may additionally mark each non-matching attribute as false. At block 632, the process 600 applies the configured binary authorization rule(s) to the trust evaluation attribute(s). The process 600 returns to decision point 620 and, as described above, makes a determination as to whether the binary evaluation passes. Again, the binary evaluation may be considered to pass if the result of the respective configured binary authorization rule(s) applied to the trust evaluation attribute(s) evaluate to true. Responsive to the determination at decision point 620, the process 600 performs as described above with respect to blocks 622 and 624, or block 626, and returns to decision point 602 to again iterate as described above.

Returning again to the description of decision point 614, in response to determining that the trust evaluation type is voting, the process 600 transitions to the processing shown and described in association with FIG. 6B, as represented by the circled letter "A" in FIGS. 6A and 6B.

FIG. 6B illustrates additional processing associated with the process 600 for secure provisioning of unknown devices through trusted third-party devices at a "trusted" computing device. As described above, under the voting trust evaluation type, either a cumulative or binary trust evaluation may be performed in combination with voting. As such, certain portions of the processing described in FIG. 6B are similar to processing described above in association with blocks 616 and 618, and in association with blocks 628-632, respectively.

As described in detail above, where the trust evaluation type is voting, either a cumulative or binary trust evaluation may be implemented in combination with voting. As such, at decision point 634, the process 600 makes a determination as to whether the trust evaluation sub-type for voting has been specified as cumulative or binary.

In response to determining that the voting trust evaluation sub-type is cumulative, the process 600 determines at block 636 whether each trust evaluation attribute received from the unknown device matches the required trust evaluation attribute and value specified for grant of trust to the unknown device. This processing of trust evaluation attributes may iterate across the respective set of trust evaluation attributes. It should be noted that as a configuration option, the process 600 may not require all trust evaluation attributes to match. At block 638, the process 600 adds the respective point value of each matching attribute to form an accumulated trust value. At block 640, the process 600 forms a local trust assessment vote, as described above, for the cumulative voting trust evaluation sub-type.

Further processing related to voting will be described in more detail below. Returning to the description of decision point 634, in response to determining that the voting trust evaluation sub-type is binary (not cumulative), the process 600 determines at block 642 whether each received trust evaluation attribute matches the request trust evaluation attribute and value specified for grant of trust to the unknown device. At block 644, the process 600 marks each matching attribute as true. As an option, the process 600 may additionally mark each non-matching attribute as false. At block 646, the process 600 applies the configured binary authorization rule(s) to the trust evaluation attribute(s). At block 640, the process 600 forms a local trust assessment vote, as described above, for the binary voting trust evaluation sub-type.

In response to forming the local trust assessment vote for either the cumulative or the binary voting trust evaluation sub-type at block 640, the process begins processing for voting resolution. At decision point 648, the process 600 makes a determination as to whether the current device is the designated vote evaluation device among a group of voting devices. In response to determining that the current device is not the designated vote evaluation device among the group of voting devices, the process 600 sends the local trust assessment vote to the designated vote evaluation device at block 650. Under this branch of processing, the process 600 returns to decision point 602 in FIG. 6A as represented by the circled letter "B" in each of FIGS. 6A and 6B, and the process 600 iterates as described above.

Alternatively, in response to determining at decision point 648 that the current device is the designated vote evaluation device among the group of voting devices, the process 600 polls other participating trusted devices and receives one or more trust assessment votes regarding the unknown device at block 652. At block 654, the process 600 evaluates the received trust assessment vote(s) in combination with the local trust assessment vote to derive a consensus regarding whether to grant trust to the unknown device. Under this branch of processing, the process 600 returns to decision point 620 in FIG. 6A as represented by the circled letter "C" in each of FIGS. 6A and 6B, and the process 600 iterates as described above. Specifically, the process 600 makes a determination at decision point 620 as to whether the evaluation of the received trust assessment vote(s) in combination with the local trust assessment vote indicates a consensus regarding whether to grant trust to the unknown device. In response to a determination that there is a consensus vote regarding granting trust to the unknown device, the process 600 branches to block 622 to provide the trust credential to the requesting device and completes this iteration of request processing as described above. Alternatively, in response to a determination that there is not a consensus vote regarding granting trust to the unknown device, the process 600 branches to block 626 to respond to the unknown device that authorization is not granted, and completes this iteration of request processing as described above. The process 600 returns to decision point 602 and iterates as described above to await another trust indication and/or trust request.

As such, the process 600 performs several different forms of processing to adjust trust designation among one or more computing devices within a computing environment. Where a particular device is designated as a trusted device, the process 600 receives and processes trust requests from unknown devices according to cumulative, binary, or voting evaluations of trust attributes requested and received from the unknown devices. The process 600 may perform processing as a vote evaluation device and may poll other trusted devices for their respective trust decisions, or may participate in a vote with one or more other trusted devices and send its local trust decision to a designated trust evaluation device of the group of trusted devices.

Some embodiments of the present invention may improve the technology of computers in one, or more, of the following ways: (i) providing automated access to secure networks by previously-unknown computing devices in a credential-based secure and distributed manner using distributed trusted devices; (ii) improving computing processing capabilities for distributed authentication of unknown computing devices; (iii) delegating trust authorization computer processing in a distributed manner within complex computing networks/systems; (iv) improving real-time automated provisioning of credentials within distributed network topologies; and (v) providing real-time secure access to networks or other resources by unknown devices that do not have a pre-configured/authorized connection to the respective networks or other resources.

The present invention is not abstract because it relates particularly to computer operations and/or hardware for reasons that may include the following: (i) providing automated access to secure networks by previously-unknown computing devices in a credential-based secure and distributed manner using distributed trusted devices; (ii) improving computing processing capabilities for distributed authentication of unknown computing devices; (iii) delegating trust authorization computer processing in a distributed manner within complex computing networks/systems; (iv) improving real-time automated provisioning of credentials within distributed network topologies; and (v) providing real-time secure access to networks or other resources by unknown devices that do not have a pre-configured/authorized connection to the respective networks or other resources.

As described above in association with FIG. 1 through FIG. 6B, the example systems and processes provide secure provisioning of unknown devices through trusted third-party devices. Many other variations and additional activities associated with secure provisioning of unknown devices through trusted third-party devices are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
by a processor of a trusted device, the trusted device including software that provides an alternate method for provisioning of unknown devices outside of a communications domain of a credentialing system:
receiving, from the credentialing system, trust evaluation rules usable to determine whether to authorize unknown devices to access a resource;
receiving a request to access the resource and device evaluation attributes from an unknown device outside of the communications domain of the credentialing system;
evaluating the trustworthiness of the unknown device based upon the device evaluation attributes using the trust evaluation rules, the evaluating including: (i) performing, for each device evaluation attribute, a binary determination of whether the device evaluation attribute matches a required value for the device evaluation attribute, resulting in a first set of one or more device evaluation attributes that evaluate as true and a second set of one or more device evaluation attributes that evaluate as false, (ii) adding an associated point value of each device evaluation attribute in the first set of one or more device evaluation attributes that evaluate as true to an accumulated trust value, and (iii) determining whether the accumulated trust value exceeds a threshold; and
in response to determining that the unknown device is trustworthy: (i) providing to the unknown device a credential from the credentialing system for accessing the resource, and (ii) sending the device evaluation attributes of the unknown device and an identification of the unknown device to the credentialing system.

2. The computer-implemented method of claim 1, where the trusted device comprises one of a plurality of trusted devices, the evaluating is performed by each of the plurality of trusted devices, and the providing of the credential is performed in response to a defined number of the plurality of trusted devices determining that the unknown device is trustworthy.

3. The computer-implemented method of claim 1, where the credential is a temporary credential.

4. The computer-implemented method of claim 1, where the credential is obtained by the trusted device from the credentialing system in response to the trusted device receiving the request to access the resource from the unknown device.

5. The computer-implemented method of claim 1, where the resource is a network and the credential provides access to the network.

6. The computer-implemented method of claim 1, where the trusted device comprises one of a plurality of trusted devices, and the trusted device is designated as a vote evaluation trusted device, and further comprising the processor of the trusted device as the vote evaluation trusted device:

polling other trusted devices of the plurality of trusted devices and receiving trust assessment votes regarding the trustworthiness of the unknown device from the other trusted devices;

where the evaluating further includes combining the received trust assessment votes with a local trust assessment vote of the trusted device, the local trust assessment vote of the trusted device being based, at least in part, on the determination of whether the accumulated trust value exceeds the threshold; and where the providing of the credential is performed in response to the combination of the received trust assessment votes with the local trust assessment vote representing a majority of the plurality of trusted devices determining that the unknown device is trustworthy.

7. A system, comprising:

a memory; and a processor of a trusted device, where the trusted device includes software that provides an alternate method for provisioning of unknown devices outside of a communications domain of a credentialing system, where the processor is programmed to:

receive, from the credentialing system, trust evaluation rules usable to determine whether to authorize unknown devices to access a resource;

receive a request to access the resource and device evaluation attributes from an unknown device outside of the communications domain of the credentialing system;

evaluate, within the memory, the trustworthiness of the unknown device based upon the device evaluation attributes using the trust evaluation rules, the evaluating including: (i) performing, for each device evaluation attribute, a binary determination of whether the device evaluation attribute matches a required value for the device evaluation attribute, resulting in a first set of one or more device evaluation attributes that evaluate as true and a second set of one or more device evaluation attributes that evaluate as false, (ii) adding an associated point value of each device evaluation attribute in the first set of one or more device evaluation attributes that evaluate as true to an accumulated trust value, and (iii) determining whether the accumulated trust value exceeds a threshold; and in response to determining that the unknown device is trustworthy: (i) provide to the unknown device a credential from the credentialing system for accessing the resource, and (ii) send the device evaluation attributes of the unknown device and an identification of the unknown device to the credentialing system.

8. The system of claim 7, where the trusted device comprises one of a plurality of trusted devices, the evaluating is performed by each of the plurality of trusted devices, and the providing of the credential is performed in response to a defined number of the plurality of trusted devices determining that the unknown device is trustworthy.

9. The system of claim 7, where the credential is a temporary credential.

10. The system of claim 7, where the credential is obtained by the processor from the credentialing system in response to the processor receiving the request to access the resource from the unknown device.

11. The system of claim 7, where the resource is a network and the credential provides access to the network.

12. The system of claim 7, where the trusted device comprises one of a plurality of trusted devices, and the trusted device is designated as a vote evaluation trusted device, and further comprising the processor being programmed to:

poll other trusted devices of the plurality of trusted devices and receive trust assessment votes regarding the trustworthiness of the unknown device from the other trusted devices;

where the evaluating further includes combining the received trust assessment votes with a local trust assessment vote of the trusted device, the local trust assessment vote of the trusted device being based, at least in part, on the determination of whether the accumulated trust value exceeds the threshold; and where the processor providing the credential is performed in response to the combination of the received trust assessment votes with the local trust assessment vote representing a majority of the plurality of trusted devices determining that the unknown device is trustworthy.

13. A computer program product, comprising:

a computer readable storage medium having computer readable program code embodied therewith, where the computer readable storage medium is not a transitory signal per se and where the computer readable program code, when executed on a computer of a trusted device, the trusted device including software that provides an alternate method for provisioning of unknown devices outside of a communications domain of a credentialing system, causes the computer to:

receive, from the credentialing system, trust evaluation rules usable to determine whether to authorize unknown devices to access a resource;

receive a request to access the resource and device evaluation attributes from an unknown device outside of the communications domain of the credentialing system;

evaluate the trustworthiness of the unknown device based upon the device evaluation attributes using the trust evaluation rules, the evaluating including: (i) performing, for each device evaluation attribute, a binary determination of whether the device evaluation attribute matches a required value for the device evaluation attribute, resulting in a first set of one or more device evaluation attributes that evaluate as true and a second set of one or more device evaluation attributes that evaluate as false, (ii) adding an associated point value of each device evaluation attribute in the first set of one or more device evaluation attributes that evaluate as true to an accumulated trust value, and (iii) determining whether the accumulated trust value exceeds a threshold; and in response to determining that the unknown device is trustworthy: (i) provide to the unknown device a credential from the credentialing system for accessing the resource, and (ii) send the device evaluation attributes of the unknown device and an identification of the unknown device to the credentialing system.

14. The computer program product of claim 13, where the trusted device comprises one of a plurality of trusted devices, the evaluating is performed by each of the plurality of trusted devices, and the providing the credential is performed in response to a defined number of the plurality of trusted devices determining that the unknown device is trustworthy.

15. The computer program product of claim 13, where the credential is a temporary credential.

16. The computer program product of claim 13, where the credential is obtained by the computer from the credentialing system in response to the computer receiving the request to access the resource from the unknown device.

17. The computer program product of claim 13, where the resource is a network and the credential provides access to the network.

18. The computer program product of claim 13, where the trusted device comprises one of a plurality of trusted devices, and the trusted device is designated as a vote evaluation trusted device, and further comprising the computer readable program code when executed on the computer causing the computer to:
   poll other trusted devices of the plurality of trusted devices and receive trust assessment votes regarding the trustworthiness of the unknown device from the other trusted devices;
   where the evaluating further includes combining the received trust assessment votes with a local trust assessment vote of the trusted device, the local trust assessment vote of the trusted device being based, at least in part, on the determination of whether the accumulated trust value exceeds the threshold; and
   where the computer providing the credential is performed in response to the combination of the received trust assessment votes with the local trust assessment vote representing a majority of the plurality of trusted devices determining that the unknown device is trustworthy.

\* \* \* \* \*